United States Patent
Singer et al.

(10) Patent No.: US 11,176,254 B2
(45) Date of Patent: Nov. 16, 2021

(54) AUTOMATIC FIRMWARE ROLLBACK

(71) Applicant: NXP USA, INC., Austin, TX (US)

(72) Inventors: Stefan Singer, Vaterstetten (DE); Osvaldo Israel Romero Cortez, Munich (DE); Guillaume Perret, Boulogne-Billancourt (FR)

(73) Assignee: NXP USA, Inc., Austin, TX (US)

( * ) Notice: Subject to any disclaimer, the term of this patent is extended or adjusted under 35 U.S.C. 154(b) by 73 days.

(21) Appl. No.: 16/502,461

(22) Filed: Jul. 3, 2019

(65) Prior Publication Data

US 2020/0372157 A1 Nov. 26, 2020

(30) Foreign Application Priority Data

May 23, 2019 (EP) .................................... 19305650

(51) Int. Cl.
*G06F 9/44* (2018.01)
*G06F 11/07* (2006.01)
(Continued)

(52) U.S. Cl.
CPC .......... *G06F 21/572* (2013.01); *G06F 9/4451* (2013.01); *G06F 9/5061* (2013.01);
(Continued)

(58) Field of Classification Search
CPC ........ G06F 21/572; G06F 21/72; G06F 21/74; G06F 9/4451; G06F 9/5061;
(Continued)

(56) References Cited

U.S. PATENT DOCUMENTS 5,010,331 A * 4/1991 Dias ........................ G04F 1/005
340/5.28
6,272,637 B1 * 8/2001 Little ...................... G06F 21/72
713/194

(Continued)

FOREIGN PATENT DOCUMENTS

JP 2017228077 A 12/2017
WO 0079390 A1 12/2000

OTHER PUBLICATIONS

Man-Lap Li et al., Understanding the Propagation of Hard Errors to Software and Implications for Resilient System Design, 2008, [Retrieved on Aug. 19, 2021]. Retrieved from the internet: <URL: https://dl.acm.org/doi/pdf/10.1145/1353536.1346315> 12 Pages (265-276) (Year: 2008).*

(Continued)

*Primary Examiner* — Anibal Rivera (57) ABSTRACT

Disclosed are various embodiments for implementing automatic firmware rollbacks after a configured number of attempts to execute the latest firmware update associated with an electronic computing unit have occurred. In a computing device, such as an electronic computing unit, a watchdog automatically generates a system reset in response to a software fault. A reset counter is configured to count a number of system resets generated by the watchdog. In response to the occurrence of the watchdog, a configurable threshold value associated with a threshold data record is compared with the value associated with the reset counter. In response to a determination that the threshold value associated with the threshold data record is greater than or equal to the value associated with the reset counter, a rollback application is executed such that the rollback application performs a swap of a first version of a firmware with a second version of the firmware.

17 Claims, 4 Drawing Sheets

(51) Int. Cl.
  *G06F 8/65* (2018.01)
  *G06F 21/57* (2013.01)
  *G06F 9/445* (2018.01)
  *G06F 9/50* (2006.01)
  *G06F 11/14* (2006.01)
  G06F 8/71 (2018.01)
  G06F 21/72 (2013.01)
  G06F 8/61 (2018.01)
  G06F 21/74 (2013.01)
  G06F 8/654 (2018.01)

(52) U.S. Cl.
  CPC ...... *G06F 11/0757* (2013.01); *G06F 11/1433* (2013.01); *G06F 8/64* (2013.01); *G06F 8/654* (2018.02); *G06F 8/71* (2013.01); *G06F 11/0739* (2013.01); *G06F 11/1417* (2013.01); *G06F 21/72* (2013.01); *G06F 21/74* (2013.01)

(58) Field of Classification Search
  CPC ............ G06F 11/0757; G06F 11/1433; G06F 11/0739; G06F 11/1417; G06F 8/64; G06F 8/71; G06F 8/654; G06F 8/65
  See application file for complete search history.

(56) References Cited

U.S. PATENT DOCUMENTS

| | | | | |
|---|---|---|---|---|
| 6,314,532 | B1* | 11/2001 | Daudelin | G06F 11/1417 714/23 |
| 6,587,966 | B1* | 7/2003 | Chaiken | G06F 11/0757 713/2 |
| 8,381,021 | B2* | 2/2013 | Howard | H04Q 9/00 714/6.12 |
| 8,868,796 | B1* | 10/2014 | Wojcik | G06F 8/65 710/8 |
| 9,081,964 | B2* | 7/2015 | Liu | G01D 4/002 |
| 9,205,809 | B2* | 12/2015 | Becker | G06F 12/00 |
| 9,690,572 | B2* | 6/2017 | Ye | G06F 8/656 |
| 10,269,452 | B2* | 4/2019 | Volpe | G06F 11/1417 |
| 10,496,469 | B2* | 12/2019 | Fox | B60W 50/04 |
| 10,853,179 | B2* | 12/2020 | Montero | G06F 9/4401 |
| 10,990,319 | B2* | 4/2021 | Grosz | G06F 3/0634 |
| 2004/0076043 | A1* | 4/2004 | Boals | G06F 11/1417 365/200 |
| 2004/0143710 | A1* | 7/2004 | Walmsley | B41J 2/04508 711/144 |
| 2004/0268116 | A1* | 12/2004 | Vasisht | G06F 11/1417 713/100 |
| 2005/0132351 | A1* | 6/2005 | Randall | G06F 11/1433 717/168 |
| 2005/0204186 | A1* | 9/2005 | Rothman | G06F 11/1471 714/6.32 |
| 2005/0210179 | A1* | 9/2005 | Walmsley | B41J 2/04505 711/3 |
| 2005/0228980 | A1* | 10/2005 | Brokish | G06F 21/74 713/2 |
| 2006/0130039 | A1* | 6/2006 | Yuuki | G06F 8/65 717/168 |
| 2007/0028296 | A1* | 2/2007 | Wachtler | H04W 8/245 726/2 |
| 2007/0055914 | A1* | 3/2007 | Chandwani | G06F 11/0715 714/47.2 |
| 2008/0140890 | A1* | 6/2008 | Klosters | G06F 11/0757 710/107 |
| 2008/0184217 | A1* | 7/2008 | Kai | G06F 8/656 717/168 |
| 2008/0256525 | A1* | 10/2008 | Ellsworth | G06F 8/60 717/168 |
| 2008/0256526 | A1* | 10/2008 | Ellsworth | G06F 11/1658 717/168 |
| 2008/0263379 | A1* | 10/2008 | Tuuk | G06F 9/3861 713/375 |
| 2009/0199049 | A1* | 8/2009 | Yorimitsu | G11B 20/1883 714/55 |
| 2010/0153602 | A1* | 6/2010 | Kume | G06F 13/4226 710/110 |
| 2010/0248707 | A1* | 9/2010 | Hoffner | H04W 24/04 455/419 |
| 2012/0054540 | A1* | 3/2012 | Howard | G06F 11/1417 714/6.12 |
| 2014/0108786 | A1* | 4/2014 | Kreft | H04L 9/0643 713/156 |
| 2014/0142781 | A1* | 5/2014 | Becker | B60R 99/00 701/1 |
| 2014/0298005 | A1* | 10/2014 | Culshaw | G06F 9/442 713/100 |
| 2015/0370579 | A1* | 12/2015 | Judd | G06F 11/0739 714/19 |
| 2016/0253471 | A1* | 9/2016 | Volpe | G06F 8/65 607/5 |
| 2016/0335071 | A1* | 11/2016 | Ham | G06F 9/44 |
| 2017/0060559 | A1* | 3/2017 | Ye | H04L 63/061 |
| 2017/0123784 | A1* | 5/2017 | Zymeri | H04L 41/082 |
| 2017/0222815 | A1* | 8/2017 | Meriac | G06F 21/554 |
| 2017/0368239 | A1* | 12/2017 | Askem | B29C 65/1635 |
| 2018/0181386 | A1* | 6/2018 | Uehara | G06F 8/65 |
| 2019/0034256 | A1* | 1/2019 | Fox | B60W 50/0225 |
| 2019/0042228 | A1* | 2/2019 | Nolan | G06F 8/654 |
| 2019/0104415 | A1* | 4/2019 | Gehrmann | H04W 12/108 |
| 2019/0349426 | A1* | 11/2019 | Smith | H04L 67/104 |
| 2019/0384528 | A1* | 12/2019 | Grosz | G06F 3/0634 |
| 2020/0201714 | A1* | 6/2020 | Montero | G06F 8/654 |
| 2020/0365345 | A1* | 11/2020 | Telefus | G01R 19/175 |
| 2020/0365346 | A1* | 11/2020 | Telefus | G01R 19/175 |
| 2020/0365356 | A1* | 11/2020 | Telefus | H01H 33/593 |
| 2020/0366078 | A1* | 11/2020 | Telefus | H01H 9/56 |
| 2020/0366079 | A1* | 11/2020 | Telefus | H01H 33/593 |

OTHER PUBLICATIONS

Dennis K. Nilsson et al., A Framework for Self-Verification of Firmware Updates over the Air in Vehicle ECUs, 2008 IEEE, [Retrieved on Aug. 19, 2021]. Retrieved from the internet: <URL: https://ieeexplore.ieee.org/stamp/stamp.jsp?tp=&arnumber=4746641> 5 Pages (1-5) (Year: 2008).*

Mansor, H. et al. "Don't Brick Your Car: Firmware Confidentiality and Rollback for Vehicles," IEEE 10th International Conference on Availability, Reliability and Security; Aug. 24-27, 2015, 10 pages.

* cited by examiner

AUTOMATIC FIRMWARE ROLLBACK

CROSS-REFERENCE TO RELATED APPLICATIONS

The present application claims priority to European Patent Application No. 19305650.4, filed on May 23, 2019, and entitled "Automatic Firmware Rollback", the entirety of which is incorporated by reference herein.

BACKGROUND

Field of the Disclosure

The present disclosure relates generally to processor devices and more generally to firmware for processor devices.

Description of the Related Art

Modern vehicles typically include various electronic subsystems to monitor and control vehicle operations. Accordingly, a vehicle may incorporate one or more Electronic Control Units ("ECUs") which are configured to control the operation of the electronic systems or subsystems in a vehicle. The functionality of an ECU is based in part on firmware executed by the ECU. In some cases, to address operational errors or to improve system functionality, an ECU can be configured to receive remote over-the-air ("OTA") updates to its firmware. Some updates may be created to address specific problems such as, for example, temperature control, radio functionality, and/or other issues. Other updates may address critical safety systems such as, for example, updates related to airbag and anti-brake functionality.

However, in some cases firmware updates for an ECU can create unforeseen errors. For example, performing an OTA firmware update can result in an inoperable ECU due to power or communication loss during the update or malfunctioning of the new firmware, and this can in turn lead to significant issues with the overall operation, safety, and reliability of the vehicle.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for automatic firmware rollback functionality in a processor based on the number of watchdog resets. In some embodiments, a watchdog reset automatically occurs in response to a software fault, such as, for example, functional faults, logical faults, performance faults, security faults, and/or other types of software faults. A reset counter is configured to be adjusted based on the occurrence of a watchdog reset. In response to the occurrence of the watchdog reset, a configurable threshold data value associated with a threshold data record is compared with the value associated with the reset counter. Based on the comparison of the threshold data value to the value associated with the reset counter, a rollback application is executed such that a current version of firmware is rolled back to a valid previous version of firmware. The previous valid version of the firmware can be stored locally at the device that executes the firmware, or can be requested, by the device, from a central server over an air interface.

Conventional rollback functionality relies on the new application firmware running in order to perform the rollback. If the new application firmware is inoperable, there is no backup mechanism to perform a rollback to a previous operable version of the firmware. In contrast, using the techniques described herein, firmware can be automatically rolled back to valid firmware based on the number of watchdog resets, improving vehicle functionality and reliability.

Figure 1:
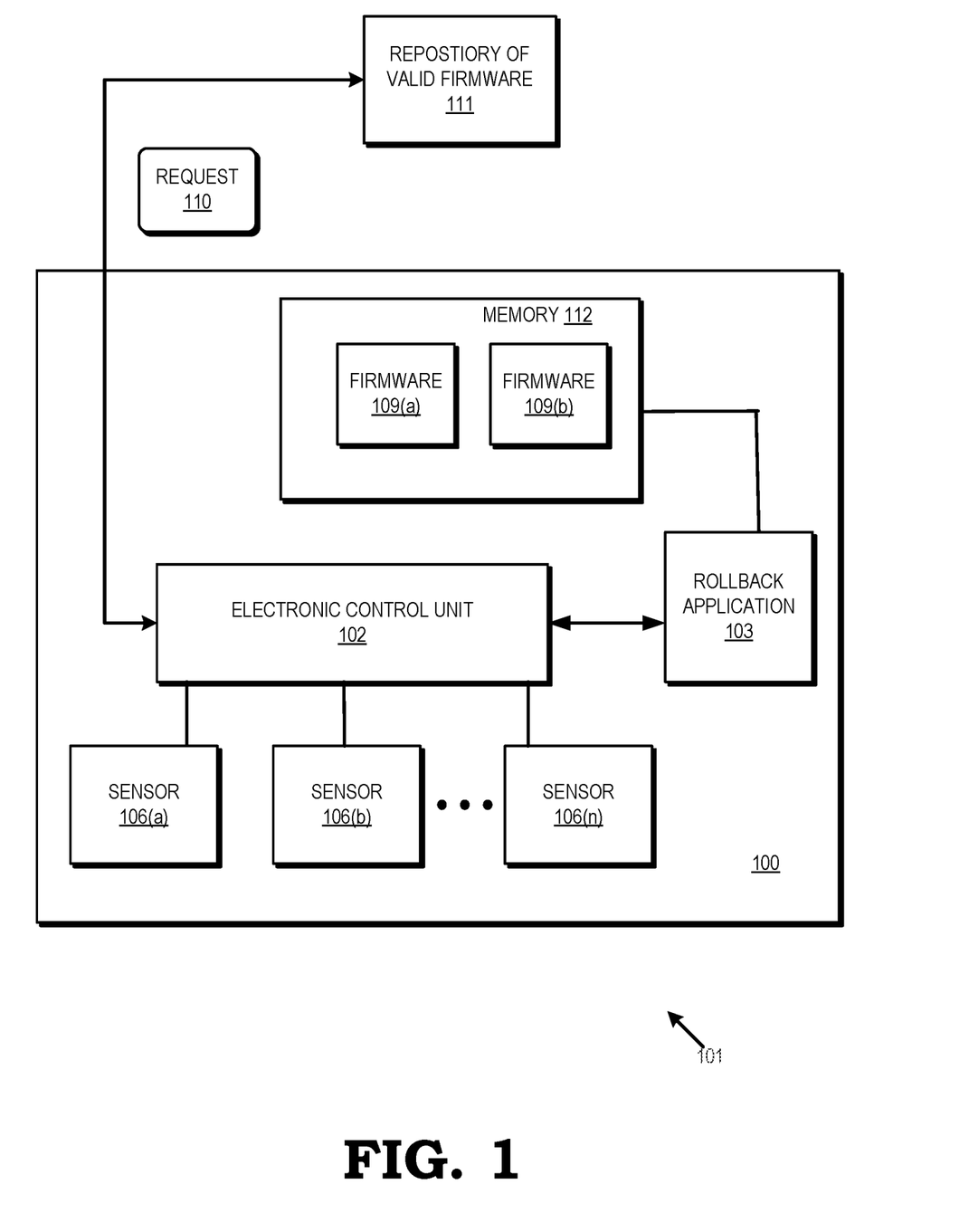
FIG. 1 is a block diagram of an electronic system employing a rollback application configured to implement automatic firmware rollback functionality in a processor based on watchdog resets in accordance with some embodiments.

FIG. 1 illustrates a firmware rollback system 101 supporting an electronic system 100 in accordance with at least one embodiment of the present disclosure. The electronic system 100 includes an electronic control unit ("ECU") 102 which is configured to control the operation of one or more of the electronic systems or subsystems in a vehicle. While FIG. 1 is described with respect to the ECU 102, it will be appreciated that in other embodiments the techniques discussed herein may be applied to any of a variety of processor systems, such as a consumer electronic device (e.g., a tablet computer, a notebook computer, a computing-enabled cellphone, a computing-enabled wearable device, etc.), communications device (e.g., a router, a base station, a hub, etc.), a commercial or industrial device, (e.g., an automotive or aeronautical control system or an industrial-scientific-medical (ISM) control system), and the like.

Returning to the example of FIG. 1, the electronic control unit 102 is configured to control the operations of the electronic subsystems of a vehicle. The electronic control unit 102 is connected to sensors 106(*a*)-106(*n*). Sensors 106(*a*)-106(*n*) are configured to detect and/or respond to physical properties such as, for example, air flow, pressure, temperature, speed, exhaust oxygen, knock and crank angle position, and/or other physical properties associated with the vehicle.

The electronic control unit 102 receives information from the variety of sensors 106(*a*)-106(*n*) and executes specified operations based on the sensor information. For example, a speed sensor at a wheel detects the wheel speed and is provided to the ECU 102 to perform anti-lock brake (ABS) operations. In at least one embodiment, the electronic control unit 102 is capable of sharing information on network communication lines to other electronic control units or electronic modules of the vehicle that use the information to perform specified operations, such as shifting of gears, displaying of speed information at a speedometer, suspension control, and the like.

In some embodiments, the vehicle includes different electronic control units 102 to control different systems on the vehicle. For purposes of description, FIG. 1 is described with respect to operation of the electronic control unit 102 is referred to herein in the singular, but it will be appreciated that the techniques described herein can be employed at other ECUs of the vehicle.

Data is stored in the memory 112 that is accessible to the electronic control unit 102. The memory 112 may be representative of a plurality of memories 112 as can be appreciated. The memory 112 is configured to store program code, as well as data used by the ECU 102 during code execution. The data stored in the memory 112, for example, is associated with the operation of various applications and/or functional entities as described below. The memory 112 also includes firmware 109(a)-109(b). Firmware 109(a)-109(b) is the computer instructions, and/or computer data that, for example, provides the necessary instructions the electronic control unit 102 to communicate with and respond to other components of the electronic system 100.

Various applications and/or other functionality may be executed by the electronic control unit 102 such as, for example, rollback application 103 according to various embodiments. The rollback application 103 is generally configured to maintain a count of watchdog resets that occur at the electronic system 100. In addition, the rollback application 103 is configured to compare the count of watchdog resets to a specified or programmable threshold. In response to the watchdog reset count exceeding the threshold, the rollback application 103 changes the set of firmware executed by the ECU 102. Thus, if an error occurs during or immediately after an update to the firmware, the rollback application 103 may be configured to access a previous version the firmware 109(a) and disable access to the current version of the firmware 109(b) in response to the occurrence of a threshold number of watchdog resets as described further herein.

However, if a previous version of the firmware 109(a) is not available in the passive block of the memory 112, or if the previous version of the firmware 109(a) stored at the memory 112 is identified as invalid firmware, then the bootloader associated with the ECU 102 is configured to issue a request 110 for valid firmware from a repository 111. In at least one embodiment, the repository 111 is a server connected to a wide area network, such as the internet, and the ECU 102 communicates the request 110 over an air interface, such as a wireless network. In response to the request 110, the repository 111 provides a valid version of the firmware 109(a) over the air interface to the ECU 102, which stores the valid version at the memory 112. The rollback application 103 then performs a roll back from the current version of the firmware 109(b) to the valid previous version of the firmware 109(a) that was obtained via the OTA update as described further herein.

Figure 2:
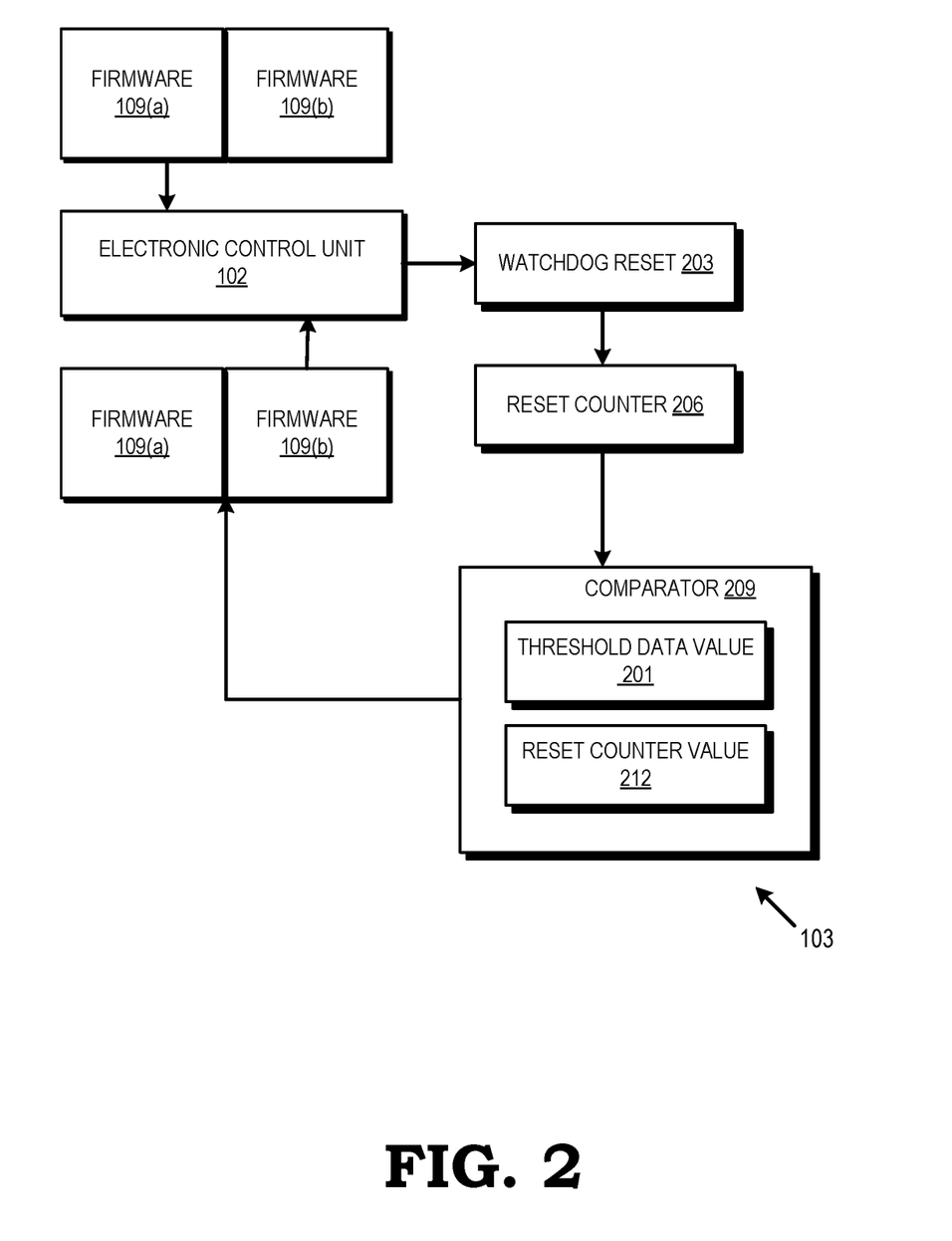
FIG. 2 is a block diagram of an illustration of the operation of the rollback application of FIG. 1 in accordance with some embodiments.

FIG. 2 provides an illustration of the operation of the rollback application 103 and various components of the electrical system 100 is provided in accordance with at least one embodiment of the present disclosure. To this end, FIG. 2 illustrates an example of automatically rolling back firmware to a previous version in response to the occurrence of a threshold number of watchdog resets. In the illustrated example, the memory 112 stores multiple versions of firmware for the ECU 102, designated firmware 109(a) and firmware 109(b). For purposes of the example, it is assumed that firmware 109(a) corresponds to an earlier set of firmware, and that the firmware 109(b) is a later set of firmware, such as an updated or revised version of the firmware 109(a).

For example, in some embodiments, if a failure occurs during the firmware update or the newly installed firmware is inoperable, a watchdog reset 203 is automatically generated. A reset counter 206 is configured to track the number of watchdog resets 203. A reset counter value 212 is configured to be adjusted based on the number of system resets generated by the watchdog reset 203. For example, in one embodiment, the reset counter value 212 may be configured to be increased in response to the watchdog reset 203. In another embodiment, reset counter value 212 may be configured to be decreased in response to the watchdog reset 203. Additionally, in response to the watchdog reset 203, a comparator 209 is configured to compare the configurable threshold data value 201 associated with a threshold data record to the value associated with the reset counter 206. Based on the comparison of the threshold data value 201 to the reset counter value 212, a rollback application 103 is executed such that the rollback application 103 performs a swap of a first version of a firmware 109(b) with a second version of the firmware 109(a). For example, in some embodiments, the first version of the firmware 109(b) corresponds to a current version of the firmware and the second version of the firmware 109(a) corresponds to a previous version of the firmware.

In some embodiments, an active block of memory 112 corresponding to the partition associated with the first version of the firmware 109(b). A passive block of memory 112 corresponding to the partition associated with the second version of the firmware 109(a). In this embodiment, the amount of memory 112 associated with the electronic control unit 102 is doubled. For example, firmware 109(a) may reside on one partition of the memory 112 and firmware 109(b) may reside on a different partition of the memory 112. To this end, the current version of the firmware is located in a "primary" flash or active block of the memory 112 and such that the memory 112 has space for the previous version of the firmware in the "secondary" flash or passive block of the memory 112. In this embodiment, the electronic control unit 102, can remain in normal operation using the primary storage, while the new firmware can be written into the secondary storage in the background. Once the update is complete, the electronic control unit 102 is configured to perform a partition swap to use the newly updated firmware.

For example, in one embodiment, the firmware 109(a) and 109(b) may reside on different partitions. In this embodiment, the electronic control unit 102 accesses the firmware 109(a) from a first partition while the firmware 109(b) is configured to be accessed from a second partition, where the firmware 109(a) is not configured to be accessed by the electronic control unit 102 during normal operation. If an error occurs during or immediately after an update, the rollback application 103 can roll back to the firmware 109(a) by disabling access to the first partition and enabling access to the second partition.

In other embodiments, the rollback application 103 is disabled by default. Therefore, in order to implement the watchdog functionality associated with the rollback application 103 a user sends a request to the electronic control unit 102 to enable the execution of the rollback application 103. The electronic control unit 102 executes the rollback application 103 in response to the appropriate user input. In one embodiment, as an initial setting, a user configures a threshold data value 201 associated with a threshold data record. For example, the threshold data value 201 may correspond to a value configurable by a user that indicates the number of watchdog resets 203 that are required before performing a firmware rollback.

Similarly, in another embodiment, the threshold data value 201 is configured to be adjusted based on the number of system resets generated by the watchdog reset 203.

Additionally, in response to the watchdog reset 203, a comparator 209 is configured to compare the configurable threshold data value 201 associated with a threshold data record the value associated with the reset counter 206. Based on the comparison of the threshold data value 201 to the reset counter value 212, a rollback application 103 is executed such that the rollback application 103 performs a swap of a first version of a firmware 109(a) with a second version of the firmware 109(b).

While the threshold data value 201 (FIG. 2) and the reset counter value (FIG. 2) are discussed, it is understood that these are examples of the many different types of values that may be adjusted with the use of the rollback application 103. For example, in one embodiment, in response to a determination that the threshold data value 201 is greater than or equal to the reset counter value 212, the electronic control unit 102 executes the rollback application 103 such that the rollback application 103 performs a swap of a first version of a firmware 109(a) with a second version of the firmware 109(b). In other embodiment, in response to a determination that the threshold data value 201 is less than or equal to the reset counter value 212, the electronic control unit 102, executes the rollback application 103 such that the rollback application 103 performs a swap of a first version of a firmware 109(a) with a second version of the firmware 109(b).

The components executed by the electronic control unit 102, for example, include a rollback application 103, and other applications, services, processes, systems, engines, or other functionality not discussed in detail herein. The rollback application 103 is executed in response to the number of watchdog resets. For example, the rollback application 103 may be executed to automatically rollback to a previous firmware 109(a) after a configured number of attempts to run the new firmware 109(b). In some embodiments, the number of attempts to run the new firmware 109(b) corresponds to the number of watchdog resets.

Figure 3:
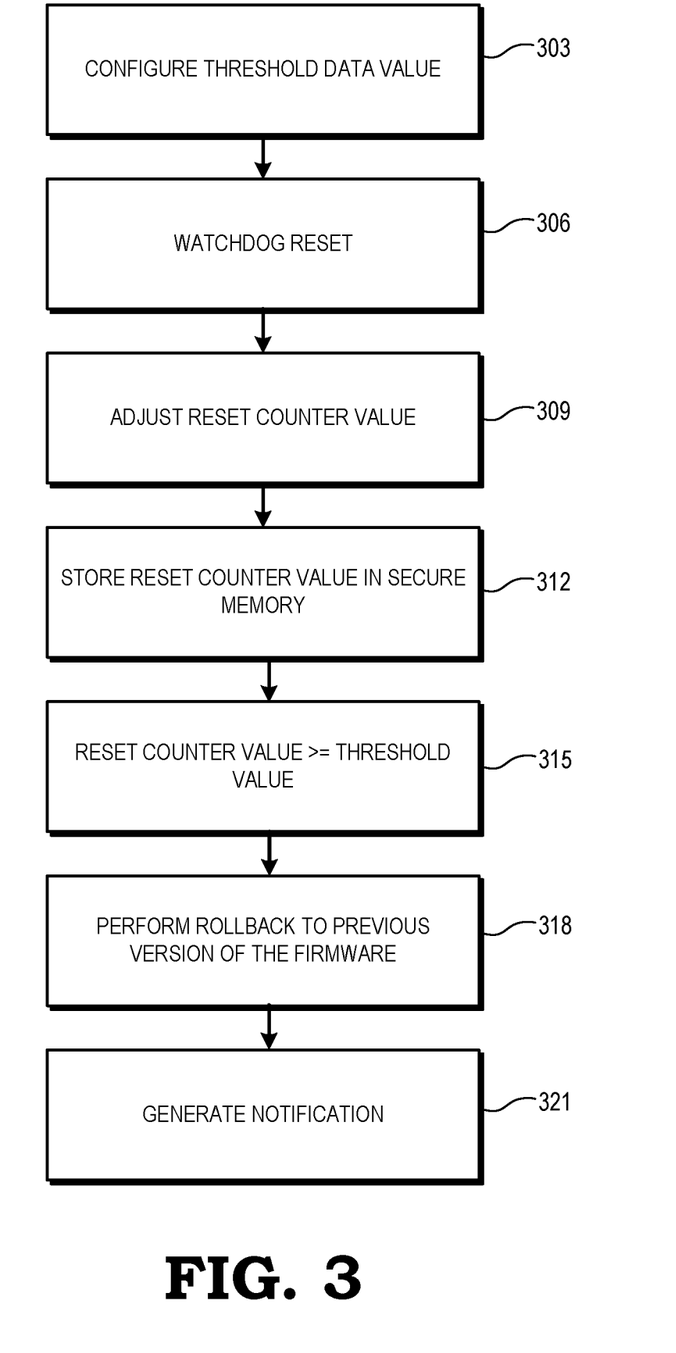
FIG. 3 is a flowchart of an example method of automatically rolling back firmware of a processor based on watchdog resets in accordance with some embodiments.

Referring next to FIG. 3, shown is a flowchart of a method of changing firmware at a processor based on the number of watchdog resets in accordance with some embodiments. For purposes of description, the method is described with respect to an example implementation at the electronic system 100 of FIG. 1. It is understood that the flowchart of FIG. 3 provides merely an example of the many different types of functional arrangements that may be employed to implement the operation of the rollback application 103 as described herein. As an alternative, the flowchart of FIG. 3 may be viewed as depicting an example of the steps of a method implemented by an electronic control unit 102 (FIG. 1) according to one or more embodiments.

Beginning with block 303, when a user employing a client device desires to perform a rollback from a current version of firmware 109(b) (FIG. 1) to a previous version of firmware 109(a) (FIG. 1), the user configures a threshold data value 201 (FIG. 2) corresponding to a value indicating the number of watchdog resets 203 (FIG. 2) that are required before performing a firmware rollback. Next, in block 306, after a firmware update, if a bug or a defect exists in the new version of the firmware, a watchdog reset 203 is generated. In block 309, in response to the watchdog reset 203, the reset counter value 212 is adjusted. In one embodiment, the reset counter 206 (FIG. 2) is configured to count the number of watchdog resets 203. For example, the reset counter value 212 may be increased or decreased in response to the watchdog reset 203. Then in block 312, the reset counter value 212 is stored to secure memory. Next in block 315, the reset counter value 212 is compared to the threshold data value 201. In block 318, based on the comparison of the threshold data value 201 to the value associated with the reset counter 206, the rollback application 103 is executed such that the rollback application 103 performs a swap of a first version of a firmware 109(a) with a second version of the firmware 109(b). For example, in one embodiment, the rollback application 103 is configured to perform a partition swap between a partition associated with the first version of the firmware 109(a) and a partition associated with the second version of the firmware 109(b). Next, in block 321, the rollback application 103 generates a notification indicating that a rollback of the firmware 109(a)-109(b) has occurred.

Figure 4:
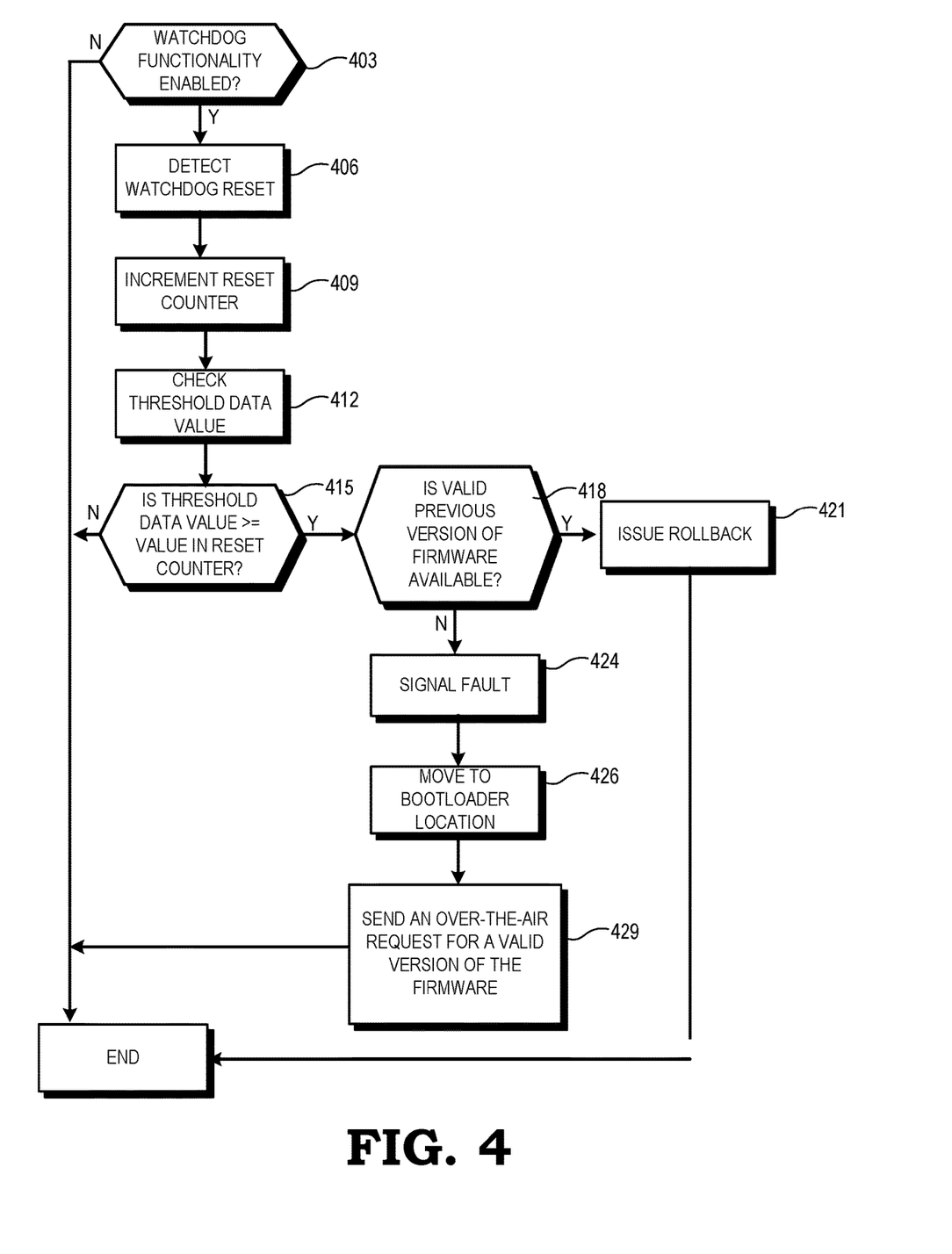
FIG. 4 is a flowchart of another example method of automatically rolling back firmware of a processor based on watchdog resets in accordance with some embodiments.

Turning now to FIG. 4, shown is a flowchart that provides another example of the operation of the rollback application 103 (FIG. 1) according to at least one embodiment of the present disclosure. It is understood that the flowchart of FIG. 4 provides merely an example of the many different types of functional arrangements that may be employed to implement the operation of the rollback application 103 as described herein. As an alternative, the flowchart of FIG. 4 may be viewed as depicting an example of the steps of a method implemented by an electronic control unit 102 (FIG. 1) according to one or more embodiments.

The flowchart sets forth an example of the functionality of the rollback application 103 in the implementation of a rollback of the current version firmware 109(b) (FIG. 1) in order to execute a previous version firmware 109(a) after a number of watchdog resets 203 (FIG. 2). It is understood that the flow may differ depending on the specific circumstances. Also, it is understood that other flows and user actions may be employed other than those discussed herein.

Beginning with block 403, if a user employing a client device sends a request to enable watchdog functionality associated with the rollback application 103 (FIG. 1), the rollback application 103 moves to block 406. Otherwise, the rollback application 103 ends. In block 406, the rollback application 103 detects a watchdog reset 203 (FIG. 2). The rollback application 103 then moves to block 409. In response to the watchdog reset 203, the rollback application 103 adjusts a value associated with the reset counter 206 (FIG. 2). In one embodiment, the reset counter 206 is configured to count the number of generated watchdog resets 203. For example, the value associated with reset counter 206 will adjust only when the source of the reset is the watchdog reset 203. If the reset generated due to a power on reset or another reset source, the value associated with the reset counter 206 will not be adjusted. The value of the reset counter 206 may be stored in a secure memory region, not accessible by an application core.

The rollback application 103 then moves to block 412. In block 412, the rollback application 103 checks the threshold data value 201 (FIG. 2). In one embodiment, the threshold data value 201 to configured by a user to correspond to the number of watchdog resets 203 that need to be generated before a rollback of the current version of the firmware 109(b) to a previous version of the firmware 109(a). Next, the rollback application 103 moves to block 415. In block 415, the rollback application 103, the rollback application 103 utilizes a comparator 209 (FIG. 2) to compare the threshold data value 201 with the reset counter value 212. In one exemplary embodiment, if the threshold data value 201 is greater than or equal to the reset counter value 212, the rollback application 103 moves to block 418. Otherwise, the rollback application 103 ends. In block 418, the rollback application 103 determines whether a previous version of the firmware 109(a) is available. If a previous version of the firmware 109(a) is available, the rollback application 103 moves to block 421, and issues the rollback from the current version of the firmware 109(b) to the previous version of the firmware 109(a). Thereafter, the rollback application 103 ends. If the rollback application 103 determines that a previous version of the firmware is not available in the memory 112 associated with the ECU 102, or that the previous version is not valid, then the rollback application 103 moves to block 424 and issues a signal fault. The rollback application 103 then moves to block 426 and moves to the bootloader location. The rollback application 103 then moves to block 429, the bootloader communicates that the MCU has no valid version of firmware available and in response the ECU 102 sends an over-the-air request 110 (FIG. 1) for a valid previous version of the firmware to the repository 111 (FIG. 1) of valid previous versions of the firmware. In response to the request, the rollback application 103 obtains the valid previous version of the firmware from the repository 111 over the air interface. The rollback application 103 then rolls back from the current version of the firmware 109(b) to the valid previous version of the firmware 109(a) obtained over-the-air from the repository 111. Thus, the rollback application 103 ends.

Embodiments may include combinations of features recited in the following numbered clauses:

1. A method comprising: in response to a watchdog reset, the watchdog reset being configured to automatically generate a system reset in response to a software fault; and based on a comparison of a threshold data value to a value associated with a reset counter, executing, by an electronic control unit, a rollback application, the rollback application being configured to implement a swap of a first version of a firmware with a second version of the firmware, wherein the first version of the firmware corresponds to a current version of the firmware and the second version of the firmware corresponds to a valid previous version of the firmware.
2. The method of clause 1, the reset counter being configured to count a number of system resets generated by the watchdog reset.
3. The method of clause 1 or 2, the value associated with the reset counter being adjusted in response to the watchdog reset.
4. The method of any of clauses 1 to 3, the threshold value being configurable by a user.
5. The method of any of clauses 1 to 4, further comprising storing the value associated with the reset counter in a secure memory region.
6. The method of any of clauses 1 to 5, wherein the reset counter is not adjusted in response to a reset that is not a watchdog reset.
7. The method of any of clauses 1 to 6, wherein executing the rollback application further comprises: sending an over-the-air request for the second version of the firmware; and obtaining the second version of the firmware from a repository of valid previous versions of the firmware, wherein the repository is external to the ECU.
8. The method of any of clauses 1 to 7, wherein executing the rollback application further comprises a partition swap between a partition associated with the first version of the firmware and a partition associated with the second version of the firmware.
9. The method of any of clauses 1 to 8, further comprising, in response to the partition swap, generating a notification, wherein the notification indicates an occurrence of the partition swap.
10. A system comprising: an electronic control unit ("ECU") configured to contain multiple versions of a firmware; a rollback application executable by the ECU, the rollback application comprising: logic that adjusts a value associated with a reset counter in response to an occurrence of a watchdog reset, the watchdog reset being configured to automatically generate a system reset in response to a software fault; and logic that executes a partition swap of a current version of a firmware with a valid previous version of the firmware based on a comparison of a threshold data value to the value associated with the reset counter.
11. The system of clause 10, the reset counter being configured to count a number of system resets generated by the watchdog reset.
12. The system of clause 10 or 11, wherein the reset counter is not adjusted in response to a reset that is not a watchdog reset.
13. The system of any of clauses 10 to 12, further comprising an enable record associated with ECU, the enable record being configured to enable an execution of the rollback application, the enable record being configurable by a user.
14. The system of any of clauses 10 to 13, further comprising logic that generates a notification in response to an occurrence of the partition swap.
15. The system of clause 14, wherein generating the notification comprises setting a flag associated with the ECU.
16. The system of clause 15, further comprising logic that stores a value associated with the flag in a secure memory region.
17. An electronic device comprising; an electronic computing unit, wherein the electronic computing unit is configured to execute a rollback application configured to perform a swap such that a current version of a firmware associated with an active block of memory being swapped with a previous version of the firmware; a reset counter, wherein the reset counter comprises an adjustable value wherein the adjustable value is adjusted in response to an occurrence of a watchdog reset, the watchdog reset being configured to automatically generate a system reset in response to a software fault, the reset counter being configured to count a number of system resets generated by the watchdog reset the adjustable value associated with the reset counter being stored in a secure memory region; and a bootloader associated with the electronic computing unit configured to send an over-the-air request to a repository of valid previous versions of firmware in response to a determination that the previous version of the firmware is not available in a passive block of the partition associated with the electronic computing unit.
18. The electronic device of clause 17, the rollback application being configured to be enabled in response to a user input.
19. The electronic device of clause 17 or 18, wherein the threshold value data record corresponds to a configurable user input.
20. The electronic device of any of clauses 17 to 19, wherein the rollback application is further configured to erase an indicator pointing to the active block of memory; and to configure the indicator to point to the passive block of memory.

Disclosed are various embodiments for implementing automatic firmware rollbacks after a configured number of attempts to execute the latest firmware update associated with an electronic computing unit have occurred. In a computing device, such as an electronic computing unit, a watchdog automatically generates a system reset in response to a software fault. A reset counter is configured to count a number of system resets generated by the watchdog. In response to the occurrence of the watchdog, a configurable threshold value associated with a threshold data record is compared with the value associated with the reset counter. In response to a determination that the threshold value associated with the threshold data record is greater than or equal to the value associated with the reset counter, a rollback application is executed such that the rollback application performs a swap of a first version of a firmware with a second version of the firmware.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A method for managing firmware at a device having an electronic control unit, comprising:
receiving a user input indicating a value of a threshold, the threshold corresponding to a number of watchdog reset operations;
generating, by a watchdog reset, a system reset associated with the electronic control unit based on a software fault; and
executing a rollback application, based on a watchdog reset counter satisfying the threshold, by swapping a first version of a firmware with a second version of the firmware and disabling access to the first version of the firmware.

2. The method of claim 1, further comprising:
tracking a number of system resets associated with the electronic control unit using the watchdog reset counter, each system reset issued by a watchdog reset operation.

3. The method of claim 1, further comprising:
adjusting a value of the watchdog reset counter based on the watchdog reset operation.

4. The method of claim 1, further comprising:
storing a value associated with the watchdog reset counter in a local memory associated with the device.

5. The method of claim 1, further comprising:
refraining from adjusting the watchdog reset counter based on an absence of a watchdog reset operation.

6. The method of claim 1, wherein executing the rollback application further comprises:
sending an over-the-air request for the second version of the firmware; and obtaining the second version of the firmware from a repository of valid previous versions of the firmware, wherein the repository is external to the electronic control unit.

7. The method of claim 1, wherein executing the rollback application further comprises:
performing a partition swap between a first partition associated with the first version of the firmware and a second partition associated with the second version of the firmware.

8. The method of claim 7, further comprising:
generating a notification including an indication of an occurrence of the partition swap.

9. An apparatus for managing firmware, comprising:
an electronic control unit; and
memory coupled with the electronic control unit, the electronic control unit configured to:

receive a user input indicating a value of a threshold, the threshold corresponding to a number of watchdog reset operations;

generate, by a watchdog reset, a system reset associated with the electronic control unit based on a software fault; and perform a partition swap of a first version of a firmware with a second version of the firmware and disable access to the first version of the firmware based on a watchdog reset counter satisfying the threshold.

10. The apparatus of claim 9, wherein the electronic control unit is further configured to:

track a number of system resets associated with the electronic control unit using the watchdog reset counter, each system reset issued by a watchdog reset operation.

11. The apparatus of claim 9, wherein the electronic control unit is further configured to:

adjust a value of the watchdog reset counter based on a watchdog reset operation.

12. The apparatus of claim 9, wherein the electronic control unit is further configured to:

generate a notification in response to an occurrence of the partition swap.

13. The apparatus of claim 12, wherein the notification comprises an indication of the occurrence of the partition swap.

14. The apparatus of claim 13, wherein the electronic control unit is further configured to:

store a value associated with the watchdog reset counter in a local memory associated with the apparatus.

15. A device comprising:

an electronic control unit; and memory coupled with the electronic control unit, the electronic control unit configured to:

receive a user input indicating a value of a threshold for executing a rollback application, the threshold corresponding to a number of watchdog reset operations;

generate, by a watchdog reset, a system reset associated with the electronic control unit of the device in response to a software fault and a watchdog reset counter;

retrieve from a remote database a second version of the firmware based on determining that the second version of the firmware is unavailable at the device; and execute the rollback application to swap between a first version of a firmware and the second version of the firmware and disable access to the first version of the firmware.

16. The device of claim 15, wherein the electronic control unit is further configured to:

adjust a value of threshold based on a watchdog reset operation.

17. The device of claim 15, wherein the electronic control unit is further configured to:

erase an indicator pointing to an active block of memory; and configure the indicator to point to a passive block of memory.

\* \* \* \* \*